(12) United States Patent
Parthasarathy et al.

(10) Patent No.: US 8,745,232 B2
(45) Date of Patent: Jun. 3, 2014

(54) SYSTEM AND METHOD TO DYNAMICALLY ALLOCATE ELECTRONIC MAILBOXES

(75) Inventors: Akshai Parthasarathy, Austin, TX (US); Mahmoud B. Ahmadian, Austin, TX (US); Rizwan Z. Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 12/858,817

(22) Filed: Aug. 18, 2010

(65) Prior Publication Data

US 2012/0047264 A1    Feb. 23, 2012

(51) Int. Cl.

| | | |
|---|---|---|
| *G06F 15/173* | (2006.01) | |
| *G06F 15/16* | (2006.01) | |
| *H04L 12/58* | (2006.01) | |
| G06F 11/14 | (2006.01) | |
| G06F 3/06 | (2006.01) | |
| G06F 17/30 | (2006.01) | |
| G06F 9/50 | (2006.01) | |

(52) U.S. Cl.
CPC ............... *H04L 51/14* (2013.01); *H04L 51/28* (2013.01); *G06F 11/1458* (2013.01); *G06F 3/061* (2013.01); *G06F 3/0653* (2013.01); *G06F 3/067* (2013.01); *G06F 3/0631* (2013.01); *G06F 3/0647* (2013.01); *G06F 11/1469* (2013.01); *G06F 17/30306* (2013.01); *G06F 9/50* (2013.01); *Y10S 707/99933* (2013.01); *Y10S 707/9994* (2013.01); *Y10S 707/99942* (2013.01); *Y10S 707/99931* (2013.01); *Y10S 707/99945* (2013.01); *Y10S 707/99941* (2013.01); *Y10S 707/99943* (2013.01); *Y10S 707/99953* (2013.01); *Y10S 707/99955* (2013.01); *Y10S 707/955* (2013.01)

USPC ........... 709/226; 709/200; 709/202; 709/203; 709/204; 709/205; 709/206; 709/207; 709/216; 709/218; 709/219; 709/220; 709/222; 709/224; 709/225; 709/227; 709/229; 709/245; 709/246; 707/999.003; 707/999.01; 707/999.101; 707/999.001; 707/999.104; 707/999.1; 707/999.102; 707/999.202; 707/999.204; 707/E17.005; 707/E17.009; 707/E17.01; 707/E17.044; 707/E17.108; 707/E17.032; 707/E17.012; 707/E17.109; 707/609; 707/706; 707/769; 707/797; 707/955; 718/105; 711/162; 711/154; 711/161; 711/165; 711/E12.001

(58) Field of Classification Search
CPC ... G06F 11/1458; G06F 3/061; G06F 3/0653; G06F 3/067; G06F 11/1469; G06F 17/30306; G06F 3/0631; G06F 3/0647; G06F 9/50; H04L 67/1097; H04L 51/14; H04L 51/28
USPC ......... 709/200, 202, 203, 204, 205, 206, 207, 709/218, 219, 220, 222, 224, 225, 226, 227, 709/229, 245, 246, 216; 707/999.003, 707/999.01, 999.101, E17.108, 999.001, 707/999.104, E17.032, E17.012, 999.1, 707/E17.044, 999.102, E17.109, 609, 706, 707/769, 782, 792, 797, 955, E17.005, 707/E17.131, E17.017, 713, E17.009, 707/E17.01, 621, 999.202, 999.204; 718/105; 711/162, 154, E12.001, 161, 711/165
IPC ............ G06F 11/1458, 11/1469, 3/061, 3/0653, G06F 3/067, 3/0631, 3/0647, 9/50, 17/30306; H04L 67/1097, 51/14, 51/28
See application file for complete search history.

(56) References Cited

U.S. PATENT DOCUMENTS

| | | | | |
|---|---|---|---|---|
| 5,915,004 | A * | 6/1999 | Pabbati et al. ........... | 379/100.08 |
| 6,718,359 | B2 * | 4/2004 | Zisapel et al. ............... | 718/105 |
| 7,085,554 | B2 | 8/2006 | Picard et al. .................. | 455/413 |
| 7,185,026 | B2 * | 2/2007 | Browning et al. ............ | 707/634 |
| 7,194,589 | B2 | 3/2007 | Lahiri et al. .................. | 711/156 |
| 7,440,887 | B2 * | 10/2008 | Soulet .......................... | 709/206 |
| 7,814,162 | B2 * | 10/2010 | Raghunandan ............... | 709/206 |
| 7,844,701 | B2 * | 11/2010 | Ramany et al. .............. | 709/224 |
| 8,082,234 | B2 * | 12/2011 | Brown et al. ................. | 707/690 |

| | | | | |
|---|---|---|---|---|
| 8,082,273 B2* | 12/2011 | Brown et al. | | 707/782 |
| 8,205,205 B2* | 6/2012 | Franke | | 718/103 |
| 8,346,874 B2* | 1/2013 | Alarid et al. | | 709/206 |
| 2002/0059427 A1* | 5/2002 | Tamaki et al. | | 709/226 |
| 2002/0069279 A1* | 6/2002 | Romero et al. | | 709/225 |
| 2003/0028555 A1* | 2/2003 | Young et al. | | 707/204 |
| 2004/0267890 A1* | 12/2004 | Soulet | | 709/206 |
| 2005/0091344 A1* | 4/2005 | Chen et al. | | 709/219 |
| 2005/0193167 A1* | 9/2005 | Eguchi et al. | | 711/114 |
| 2006/0215632 A1* | 9/2006 | Adams et al. | | 370/352 |
| 2007/0027985 A1* | 2/2007 | Ramany et al. | | 709/224 |
| 2007/0055735 A1* | 3/2007 | Raghunandan | | 709/206 |
| 2008/0229318 A1* | 9/2008 | Franke | | 718/104 |
| 2009/0070771 A1* | 3/2009 | Yuyitung et al. | | 718/105 |
| 2009/0132536 A1* | 5/2009 | Brown et al. | | 707/9 |
| 2009/0132611 A1* | 5/2009 | Brown et al. | | 707/203 |
| 2009/0172666 A1* | 7/2009 | Yahalom et al. | | 718/1 |
| 2009/0327216 A1* | 12/2009 | Brown et al. | | 707/2 |
| 2009/0327242 A1* | 12/2009 | Brown et al. | | 707/3 |
| 2010/0011033 A1* | 1/2010 | Czeczulin | | 707/204 |
| 2010/0125565 A1* | 5/2010 | Burger et al. | | 707/713 |
| 2010/0138500 A1* | 6/2010 | Consul et al. | | 709/206 |
| 2010/0145929 A1* | 6/2010 | Burger et al. | | 707/713 |
| 2010/0145932 A1* | 6/2010 | Rook et al. | | 707/722 |
| 2010/0159881 A1* | 6/2010 | Yasaki et al. | | 455/411 |
| 2011/0096919 A1* | 4/2011 | Daye et al. | | 379/265.12 |
| 2011/0107053 A1* | 5/2011 | Beckmann et al. | | 711/171 |
| 2011/0167039 A1* | 7/2011 | Kol et al. | | 707/633 |
| 2011/0191485 A1* | 8/2011 | Umbehocker | | 709/229 |
| 2011/0307601 A1* | 12/2011 | Hogan et al. | | 709/224 |
| 2011/0320546 A1* | 12/2011 | Holden | | 709/206 |

\* cited by examiner

*Primary Examiner* — Saket K Daftuar
(74) *Attorney, Agent, or Firm* — Baker Botts L.L.P.

(57) ABSTRACT

Systems and methods for balancing electronic mailboxes among databases communicatively coupled to an information handling system are disclosed. A method may include comparing an actual utilization values for a first database to a threshold utilization value for the first database and, depending upon the results, identifying the first database as over-utilized. The method may also include comparing an actual utilization values for a second database to a threshold utilization value for the second database and, depending upon the results, identifying the second database as under-utilized. The method may further include comparing a threshold usage value of a first electronic mailbox stored in the first database to an upper threshold usage value for the first electronic mailbox and, depending upon the results, identifying the first electronic mailbox as heavily-utilized. The method may also include moving the heavily-utilized electronic mailbox to the second database.

18 Claims, 3 Drawing Sheets

SYSTEM AND METHOD TO DYNAMICALLY ALLOCATE ELECTRONIC MAILBOXES

TECHNICAL FIELD

The present disclosure relates generally to information handling systems and, more particularly, to balancing the utilization of a plurality of electronic mailboxes within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as enterprise data storage, financial transaction processing, airline reservations, or global communications. In addition, information handling systems may include a variety of hardware and software components that may be configured to process, store, and communicate information and may include one or more computer systems, data storage systems, and networking systems.

Increasingly, information handling systems are used to facilitate ever-increasing volumes of digital communication among a large number of users. In addition to the increasing volume of communication requests, these requests require greater and greater demands on the information handling system due to the size of a communication request and the expected response time of the information handling system. Some efforts have been made to balance the load of electronic mailboxes designed to facilitate these communications. However, these efforts do not take into account the dynamic nature of electronic mailbox usage.

SUMMARY

In accordance with the teachings of the present disclosure, the disadvantages and problems associated with electronic mailboxes stored on databases have been substantially reduced or eliminated.

In accordance with one embodiment of the present disclosure, a method for balancing a plurality of electronic mailboxes among a plurality of databases is disclosed. The method may include comparing an actual utilization value for a first database, the first database being one of the plurality of databases, to an upper threshold utilization value for the first database and, if the actual utilization value of the first database is greater than the upper threshold utilization value of the first database, identifying the first database as over-utilized. As well, the method may include comparing an actual utilization value for a second database, the second database being one of the plurality of databases, to a lower threshold utilization value for the second database and, if the actual utilization value of the second database is less than the lower threshold utilization value of the second database, identifying the second database as under-utilized. The method may also include comparing an actual usage value of a first electronic mailbox, the first electronic mailbox being one of the plurality of electronic mailboxes stored in the first database, to an upper threshold usage value for the first electronic mailbox and, if the actual usage value of the first electronic mailbox is greater than the upper threshold usage value of the first electronic mailbox, identifying the first electronic mailbox as a heavily-utilized first electronic mailbox. The method may further include moving the heavily-utilized first electronic mailbox to the second database.

In accordance with another embodiment of the present disclosure, an information handling system for balancing a plurality of electronic mailboxes among a plurality of databases is disclosed. The information handling system may include a data gathering module. The data gathering module may compare an actual utilization value of a first database, the first database being one of the plurality of databases, to an upper threshold utilization value of the first database and, if the actual utilization value of the first database is greater than the upper threshold utilization value of the first database, identify the first database as over-utilized. The data gathering module may also compare an actual utilization value of a second database, the second database being one of the plurality of databases, to a lower threshold utilization value of the second database and, if the actual utilization value of the second database is less than the lower threshold utilization value of the second database, identify the second database as under-utilized. Furthermore, the data gathering module may notify a component utilization controller module to move a heavily-utilized first electronic mailbox in the first database to the second database, wherein the heavily-utilized first electronic mailbox is identified based at least on comparing an actual usage value of the first electronic mailbox to an upper threshold usage value for the first electronic mailbox.

In accordance with a further embodiment of the present disclosure, an information handling system for balancing a plurality of electronic mailboxes among a plurality of databases is disclosed. The information handling system may include a component utilization controller module. The component utilization controller module may receive a notification from a data gathering module to move a heavily-utilized first electronic mailbox in an over-utilized database to an under-utilized database. Additionally, the component utilization controller module may compare an actual usage value of a first electronic mailbox, the first electronic mailbox being one of the plurality of electronic mailboxes stored in the over-utilized database, to an upper threshold usage value for the first electronic mailbox and, if the actual usage value of the first electronic mailbox is greater than the upper threshold usage value of the first electronic mailbox, identify the first electronic mailbox as the heavily-utilized first electronic mailbox. The component utilization controller module may further move the heavily-utilized first electronic mailbox in the over-utilized database to the under-utilized database.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
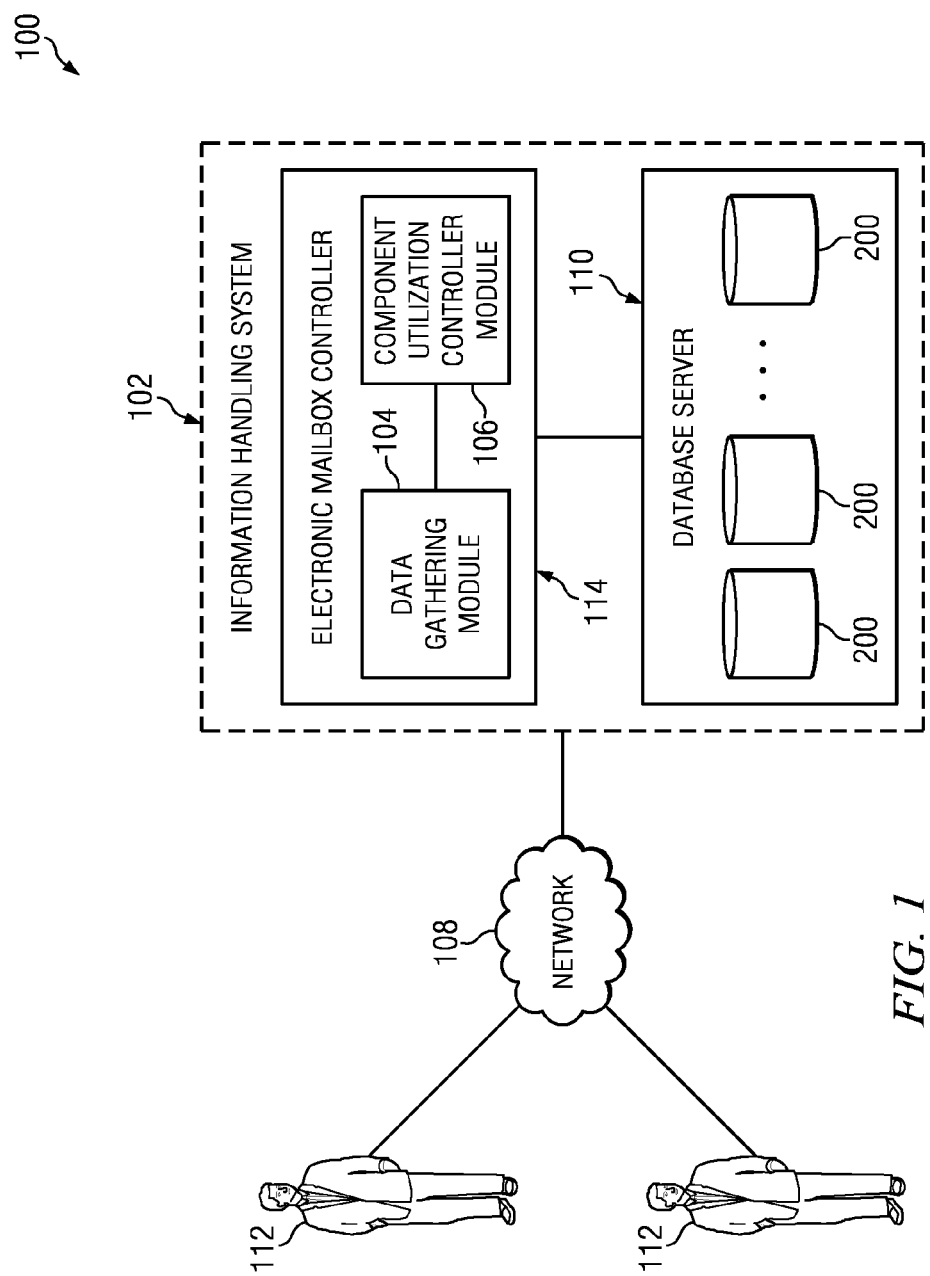
FIG. 1 illustrates a system for balancing a plurality of electronic mailboxes among a plurality of databases of an information handling system, in accordance with teachings of the present disclosure.

FIG. 1 illustrates a system 100 for balancing a plurality of electronic mailboxes among a plurality of databases 200 of an information handling system 102. As depicted in FIG. 1, system 100 may, in some embodiments, comprise an information handling system 102, a network 108, and one or more users 112. In some embodiments, system 100 may include one or more users 112 in communication with information handling system 102 via network 108. In some embodiments, system 100 may include electronic mailbox controller 114 communicatively coupled to database server 110. For ease of illustration, electronic mailbox controller 114 and database server 110 are depicted as separate modules. In some embodiments, electronic mailbox controller 114 and database server 110 may be separate modules. In other embodiments, electronic mailbox controller 114 and database server 110 may be a part of the same module. Additionally, electronic mailbox controller 114 and database server 110 may reside on one or more information handling systems, and if they do reside on more than one information handling system, they may be geographically distance from one another.

Information handling system 102 may generally be operable to, via network 108, receive data from and/or communicate data to one or more users 112 via network 108. As depicted in FIG. 1, information handling system 102 may comprise one or more electronic mailbox controllers 114 and one or more database servers 110.

Electronic mailbox controller 114 may generally be operable to read data from and/or write data to one or more databases 200 disposed in database server 110. In the same or alternative embodiments, electronic mailbox controller 114 may be operable to receive data from and/or communicate data to one or more users 112 via network 108. As depicted in FIG. 1, electronic mailbox controller 114 may comprise a data gathering module 104 and a component utilization controller module 106. Component utilization controller module 106 may be communicatively coupled to data gathering module 104.

As an illustrative example, electronic mailbox controller 114 may be Microsoft Exchange Server, Lotus Notes, Domino, or any other appropriate electronic mailbox controller operable to read and/or write data to one or more databases 200.

Data gathering module 104 may be configured to identify or retrieve upper threshold, lower threshold, and/or actual utilization values for databases 200. The upper threshold and/or lower threshold utilization values may be identified in any suitable manner. In some embodiments, the upper threshold and/or lower threshold utilization values of databases 200 may be substantially based on predetermined characteristic of databases 200, as described in more detail below. The actual utilization values of databases 200 may be substantially based on current utilization information for databases 200, as described in more detail below. In some embodiments, current utilization information may be drawn from various performance parameters of databases 200. As an illustrative example, current utilization information may include input-output operations per second (IOPS).

Data gathering module 104 may be further configured to identify a particular database 200 as over-utilized by comparing database 200's upper threshold utilization value and database 200's actual utilization value. When a particular database 200 has an actual utilization value greater than database 200's upper threshold utilization value, database 200 may be identified as over-utilized by data gathering module 104, as described in more detail below with reference to FIGS. 2-4. As an illustrative example, if the data sheet for database 200 identifies its maximum recommended operating rate at 60 IOPS, the upper utilization value for database 200 may be set at 60 IOPS. If the actual utilization value of database 200 is greater than 60 IOPS, database 200 may be identified as over-utilized.

Data gathering module 104 may further be configured to identify a particular database 200 as under-utilized by comparing database 200's lower threshold utilization value and database 200's actual utilization value. When a particular database 200 has an actual utilization value less than database 200's lower threshold utilization value, database 200 may be identified as under-utilized by data gathering module 104, as described in more detail below with reference to FIGS. 2-4. As an illustrative example, if the data sheet for database 200 identifies its minimum recommended operating rate at 40 IOPS, the lower utilization value for database 200 may be set at 40 IOPS. If the actual utilization value of database 200 is less than 40 IOPS, database 200 may be identified as under-utilized.

Upon identifying an over-utilized database 200 and an under-utilized database 200, data gathering module 104 may be further configured to notify component utilization controller module 106 that there is an over-utilized database 200 that may have one or more heavily-utilized electronic mailboxes that may be moved to an under-utilized database 200. If an over-utilized database 200 is identified by data gathering module 104 and no under-utilized database 200 is identified, a notification may be created by data gathering module 104. In certain embodiments, the notification may be sent to an administrator to facilitate resolution of the issue or potential issue.

Data gathering module 104 may be, in some embodiments, a software program stored on computer-readable media and executable by a processor of information handling system 102. For clarity of description, FIG. 1 depicts data gathering module 104 as a separate module. In some embodiments, data gathering module 104 may be a stand-alone software program. However, data gathering module 104 may also be a component or subroutine of a larger software program, such as the operating system, or hard-coded into computer-readable media, firmware stored on computer-readable media, and/or any hardware or software module configured to identify or retrieve upper threshold, lower threshold, and/or actual utilization values from databases 200.

Component utilization controller module 106 may be configured to move electronic mailboxes among databases 200 based at least on the upper threshold, lower threshold, and/or actual utilization values identified or retrieved by data gathering module 104 and/or any notifications received from data gathering module 104. Upon receiving a notification from data gathering module 104 to move a heavily-utilized electronic mailbox from an over-utilized database 200 to an under-utilized database 200, component utilization controller module 106 may identify a heavily-utilized electronic mailbox in the over-utilized database 200. The identification of a heavily-utilized electronic mailbox may be based upon a finding that a particular electronic mailbox's actual usage value may be greater than such electronic mailbox's upper threshold usage value. In certain embodiments, an electronic mailbox's upper threshold usage value may be based upon a value that an administrator may deem an appropriate usage level to indicate the mailbox has reached a usage level deemed heavily-utilized.

In certain embodiments, an electronic mailbox's actual usage value may be based upon the number of requests sent and/or received from an electronic mailbox located in a database 200. The number of requests sent and/or received from an electronic mailbox located in a database 200 may be obtained from, in certain embodiments, log files, such as the transport log files used by Microsoft Exchange.

After identifying a heavily-utilized electronic mailbox, the heavily utilized electronic mailbox may then be moved to the under-utilized database 200 identified by data gathering module 104. Component utilization controller module 106 may also move a lightly-utilized or moderately-utilized electronic mailbox from the under-utilized database 200 identified by data gathering module 104 to the over-utilized database 200 identified by data gathering module 104. The identification of a lightly-utilized electronic mailbox may be based upon a finding that a particular electronic mailbox's actual usage value may be less than such electronic mailbox's lower threshold usage value. The identification of a moderately-utilized electronic mailbox may be based upon a finding that a particular electronic mailbox's actual usage value may be greater than such electronic mailbox's lower threshold usage value and lower than such electronic mailbox's upper threshold usage value. In certain embodiments, an electronic mailbox's lower threshold usage value may be based upon a value that an administrator may deem an appropriate usage level to indicate the mailbox has a usage level deemed lightly-utilized. In some embodiments, the upper threshold usage value may be different than the lower threshold usage value. In other embodiments, the upper threshold usage value and lower threshold usage value may be the same.

After identifying a lightly-utilized or moderately-utilized electronic mailbox, the lightly-utilized or moderately-utilized electronic mailbox may then be moved to the over-utilized database 200 identified by data gathering module 104. In certain embodiments, the moving of electronic mailboxes may be done on a one to one basis between the over-utilized database 200 and the under-utilized database 200 in order to keep the number of electronic mailboxes on each database 200 at a specific level. In these and other embodiments, electronic mailboxes may be moved at a specific time each day or a varying times.

Component utilization controller module 106 may be, in some embodiments, a software program stored on computer-readable media and executable by a processor of information handling system 102. For clarity of description FIG. 1 depicts component utilization controller module 106 as a separate module. In some embodiments, component utilization controller module 106 may be a stand-alone software program. However, component utilization controller module 106 may also be a component or subroutine of a larger software program, such as the operating system, or may be hard-coded into computer-readable media, firmware stored on computer-readable media, and/or any hardware or software module configured to move electronic mailboxes among databases 200 based at least on the upper threshold, lower threshold, and/or actual utilization values identified or retrieved by data gathering module 104 and/or any notifications received from data gathering module 104.

Database server 110 may comprise one or more databases 200, and may be communicatively coupled to electronic mailbox controller 114 and/or network 108, in order to facilitate communication of data between electronic mailbox controller 114 and databases 200. In the same or alternative embodiments, database server 110 may be operable to receive data from and/or communicate data to one or more users 112 via network 108. Databases 200 may each be located on one or more hard disk drives, magnetic tape libraries, optical disk drives, magneto-optical disk drives, compact disk drives, compact disk arrays, disk array controllers, and/or any other type of computer-readable media. In certain embodiments, a database 200's upper threshold utilization value identified by data gathering module 104 may be based upon manufacturer specification data for the computer-readable media that the database 200 may be located on. In another embodiment, a database 200's upper threshold utilization value identified by data gathering module 104 may be based upon industry standard specification data for the computer-readable media that the database 200 may be located on. Similarly, in certain embodiments, a database 200's lower threshold utilization value identified by data gathering module 104 may be based upon manufacturer specification data for the computer-readable media that the database 200 may be located on. In another embodiment, a database 200's lower threshold utilization value identified by data gathering module 104 may be based upon industry standard specification data for the computer-readable media that the database 200 may be located on.

The actual utilization value of a database 200 retrieved by data gathering module 104 may be based upon actual utilization information for the computer-readable media that the database 200 may be located on. In certain embodiments, the actual utilization may be measured by the input/output operations per second (IOPS) of the computer-readable media the database 200 may be located on. IOPS can be measured at different times. In certain embodiments, IOPS may be measured during only peak business hours. In another embodiment, IOPS may be measured constantly at all times.

In some embodiments, database server 110 may include one or more storage enclosures configured to hold and power one or more physical storage resources comprising databases 200. In such embodiments, such storage enclosures may be communicatively coupled to electronic mailbox controller 114 and/or network 108, in order to facilitate communication of data between electronic mailbox controller 114 and databases 200.

Users 112 may generally be operable to, via network 108, read data from and/or write data to one or more electronic mailboxes located on one or more databases 200 disposed in database server 110. In the same or alternative embodiments, users 112 may be operable to communicate with information handling system 102 via network 108. Users 112 may take a variety of forms. In certain embodiments, users 112 may be one or more persons. In the same or alternative embodiments, users 112 may be machines (e.g., information handling systems). Users 112 may also communicate with electronic mailboxes and/or information handling system 102 through a number of devices. In certain embodiment, users 112 may use an information handling system (e.g., a personal computer, smart phone, etc.) to communicate with electronic mailboxes and/or information handling system 102.

Network 108 may be a network and/or fabric configured to couple information handling system 102 to users 112. In certain embodiments, network 108 may also allow electronic mailbox controller 114 to couple to databases 200 disposed in database server 110 such that databases 200 appear to information handling system 102 as locally attached storage resources. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof.

In operation, electronic mailboxes may initially be distributed in a balanced manner across databases 200 located on database server 110. In certain embodiments, "balanced manner" means that the distribution of electronic mailboxes may be done in a way such that each database 200 has a similar number of each type of electronic mailbox: heavily-utilized, lightly-utilized, and moderately-utilized. In other embodiments, due to the unequal performance characteristics of the various databases 200, "balanced manner" may indicate that the electronic mailboxes are balanced relative to the performance characteristics of database 200. As an illustrative example, a high-performance database within database server 110 may be "balanced" when it carries more heavily-utilized mailboxes than another, lesser-performing database within database server 110. In still other embodiments, the characteristics of the components of system 100 may generally be operable without an initial balancing.

The electronic mailboxes are then used by users 112 and the utilization information for each database 200 may be identified or retrieved by data gathering module 104 over some time period.

Data gathering module 104 may at some point identify a database 200 as having become over-utilized. Data gathering module 104 may then attempt to identify an under-utilized database 200. Upon identifying both an over-utilized database 200 and an under-utilized database 200, data gathering module 104 may then notify component utilization controller module 106 that a heavily-utilized electronic mailbox located on the over-utilized database 200 may be moved to the under-utilized database 200 and, further, that a lightly-utilized electronic mailbox or a moderately-utilized electronic mailbox from the under-utilized database 200 may be moved to the over-utilized database 200. If an over-utilized database 200 was identified and no under-utilized database 200 was also identified, a notification may be created to alert an administrator of a potential problem. Upon receiving such a notification from data gathering module 104, component utilization controller module 106 may identify a heavily-utilized electronic mailbox on the over-utilized database 200. Further, component utilization controller module 106 may identify a lightly-utilized electronic mailbox or a moderately-utilized electronic mailbox on the under-utilized database 200. Component utilization controller module 106 may then move the heavily-utilized electronic mailbox from the over-utilized database 200 to the under-utilized database 200. Further, component utilization controller module 106 may move the lightly-utilized or moderately-utilized electronic mailbox from the under-utilized database 200 to the over-utilized database 200.

Figure 2:
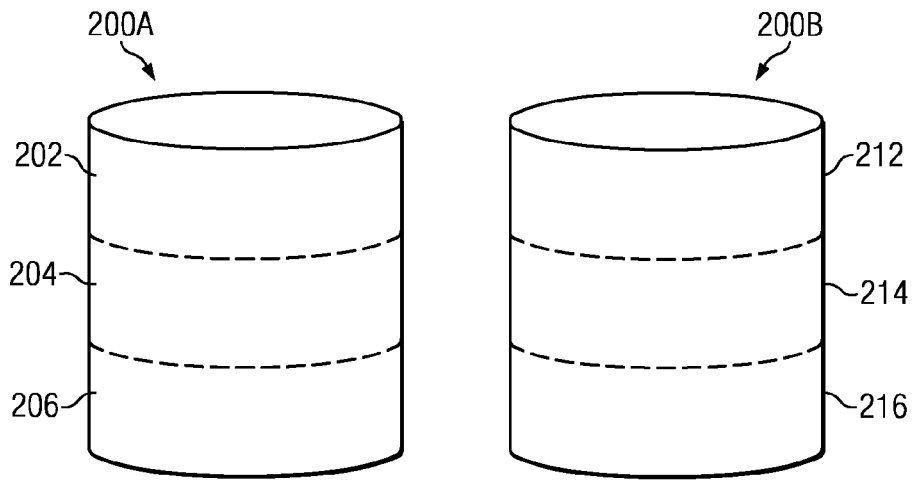
FIG. 2 illustrates a plurality of databases, wherein electronic mailboxes are initially distributed across the plurality databases in a balanced manner, in accordance with teachings of the present disclosure.

FIG. 2 illustrates a plurality of databases 200, wherein electronic mailboxes may be initially distributed across the plurality of databases 200 in a balanced manner, in accordance with teachings of the present disclosure. As depicted in FIG. 2, the plurality of databases 200 may include a first database 200A and a second database 200B. Also, the first database 200A may comprise one or more electronic mailboxes that may be heavily-utilized electronic mailboxes 202, moderately-utilized electronic mailboxes 204, and/or lightly-utilized electronic mailboxes 206. Additionally, the second database 200B may comprise one or more electronic mailboxes that may be heavily-utilized electronic mailboxes 212, moderately-utilized electronic mailboxes 214, and/or lightly-utilized electronic mailboxes 216. The identification of heavily-utilized, moderately-utilized, and lightly-utilized electronic mailboxes was described in more detail with reference to FIG. 1.

Electronic mailboxes may comprise information associated with one or more users 112. In certain embodiments, the information that comprises an electronic mailbox may include messages a user 112 has sent, messages a user 112 has received, and/or any other type of messages associated with a user 112. Electronic mailboxes may be used, in certain embodiments, by users 112 to store communications from, or sent to, other electronic mailbox users 112. Illustrative examples of electronic mailboxes may be electronic mail accounts with Google Mail, electronic mail accounts provided by employers, and any other resource capable of storing messages associated with a user 112.

In certain embodiments, the initial distribution of electronic mailboxes among the plurality of databases 200 is done in such a way that first database 200A and second database 200B have a substantially similar number of heavily-utilized electronic mailboxes 202, 212, moderately-utilized electronic mailboxes 204, 214, and lightly-utilized electronic mailboxes 206, 216, respectively. However, after some amount of time, the distribution of electronic mailboxes among the plurality of databases 200 may change and one or more of the plurality of databases 200 may become an over-utilized database 200 or an under-utilized database 200.

This imbalance may be due to users 112 of the electronic mailboxes located on the first database 200A and the second database 200B changing their amount of electronic mailbox usage and/or users 112 of the electronic mailboxes located on the first database 200A and the second database 200B changing their method of communicating with electronic mailboxes. As an illustrative example, user 112 may change job functions in a way that necessitates a change in the volume of message transmitted. As an additional illustrative example, user 112 may change methods of accessing an electronic mailbox by using a smartphone, which may require an increase in the number of requests to access an electronic mailbox. The identification of databases 200 as over-utilized or under-utilized was described in more detail with reference to FIG. 1.

Figure 3:
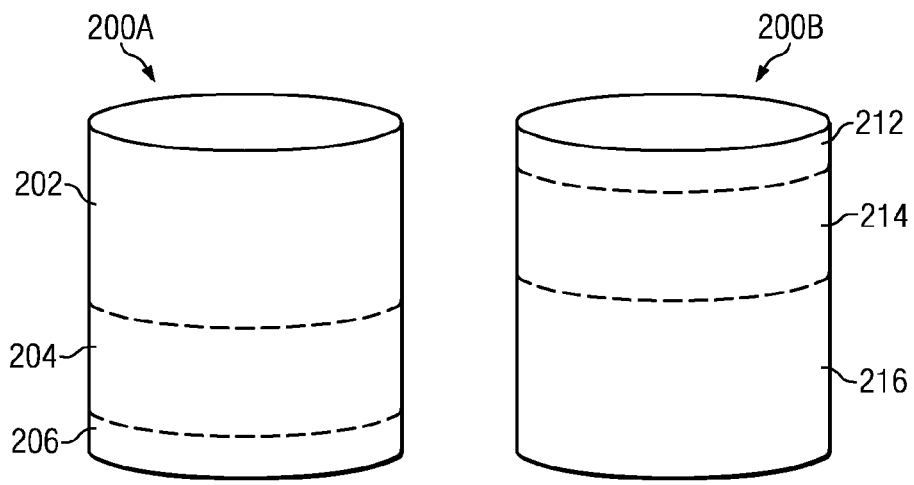
FIG. 3 illustrates a plurality of databases, wherein electronic mailboxes are no longer distributed across the plurality databases in a balanced manner, in accordance with teachings of the present disclosure.

FIG. 3 illustrates a plurality of databases 200, wherein electronic mailboxes are no longer distributed across the plurality of databases 200 in a balanced manner, in accordance with teachings of the present disclosure. As depicted in FIG. 3, the plurality of databases 200 may include a first database 200A and a second database 200B. Also, the first database 200A may comprise one or more electronic mailboxes that may be heavily-utilized electronic mailboxes 202, moderately-utilized electronic mailboxes 204, and/or lightly-utilized electronic mailboxes 206. Additionally, the second database 200B may comprise one or more electronic mailboxes that may be heavily-utilized electronic mailboxes 212, moderately-utilized electronic mailboxes 214, and/or lightly-utilized electronic mailboxes 216. The identification of heavily-utilized, moderately-utilized, and lightly-utilized electronic mailboxes was described in more detail with reference to FIG. 1. Electronic mailboxes were described in more detail with reference to FIG. 2.

In certain embodiments, the electronic mailboxes of the plurality of databases 200 may no longer be distributed in a balanced manner. This imbalance may be due to users 112 of the electronic mailboxes changing their amount of electronic mailbox usage. For example, the imbalance shown in FIG. 3 may have evolved from a situation where the plurality of databases were initially balanced, as in FIG. 2, but then twenty-five percent of the users 112 of the electronic mailboxes on the first database 200A, all of which may have previously been light users, may have begun using their electronic mailboxes much more. This change in electronic mailbox usage may have led to both a fifty percent increase in the number of heavily-utilized electronic mailboxes 202 and a fifty percent decrease in the number of lightly-utilized electronic mailboxes 206 on the first database 200A. Similarly, twenty-five percent of the users 112 of the electronic mailboxes on the second database 200B, all of which may have previously been heavy users, may have begun using their electronic mailboxes much less. This change in electronic mailbox usage may have led to both a fifty percent increase in the number of lightly-utilized electronic mailboxes 202 and a fifty percent decrease in the number of heavily-utilized electronic mailboxes 206 on the first database 200A.

In the same or an alternative embodiment, the electronic mailboxes may no longer be distributed in a balanced manner due to users 112 of the electronic mailboxes located on the first database 200A and the second database 200B changing their method of communicating with electronic mailboxes, as described in more detail above with reference to FIG. 2.

Figure 5:
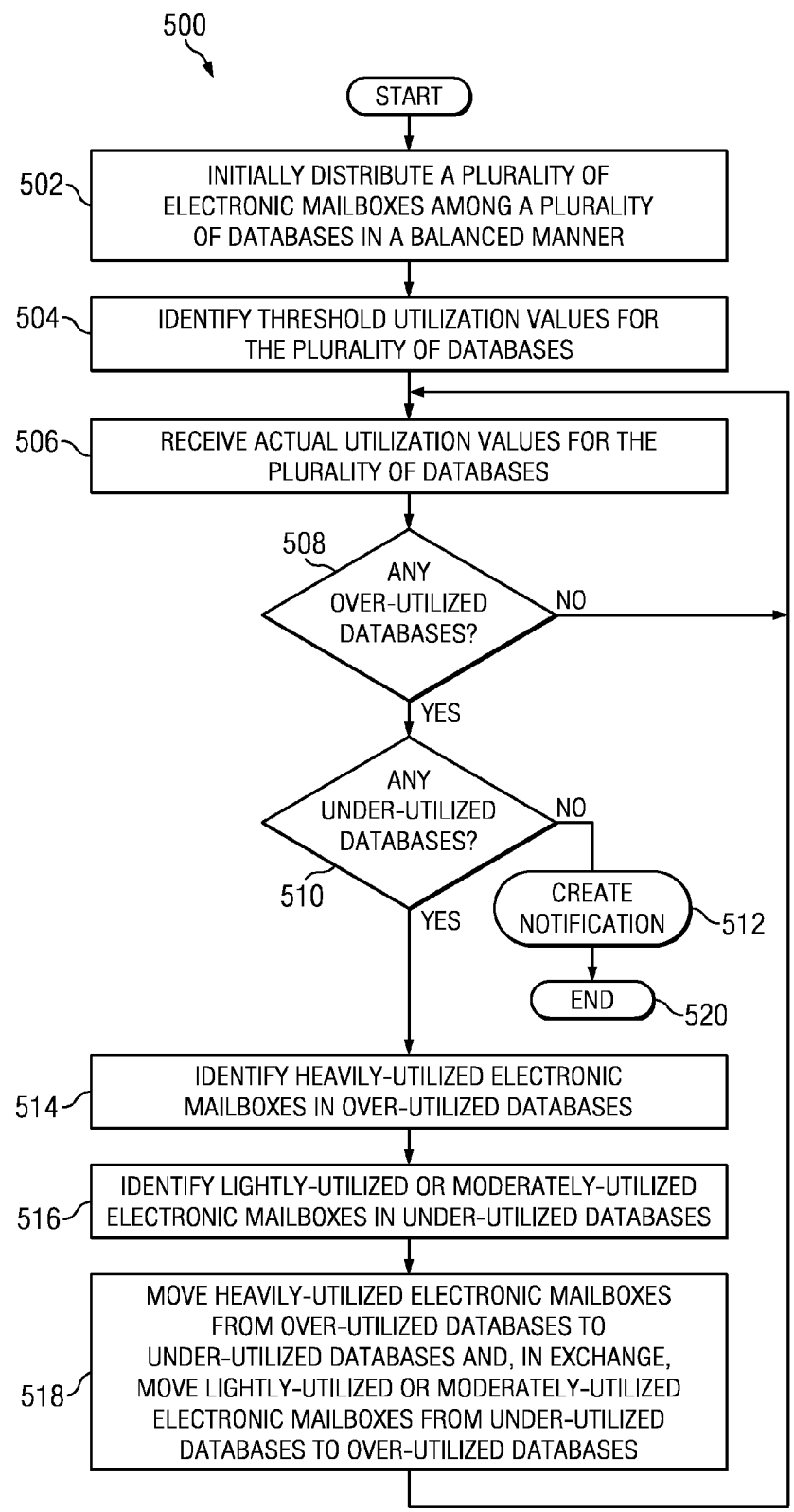
FIG. 5 depicts a flow chart of an example method for balancing a plurality of electronic mailboxes among a plurality of databases, in accordance with teachings of the present disclosure.

As an illustrative example of the methods and systems described in more detail in FIGS. 1 and 5, depending upon the actual utilization value and upper threshold utilization value of the first database 200A, the first database 200A may be identified as an over-utilized database 200 by data gathering module 104. Also, depending upon the actual utilization value and lower threshold utilization value of the second database 200B, the second database 200B may be identified as an under-utilized database 200 by data gathering module 104. If the first database 200A is identified by data gathering module 104 as over-utilized and the second database is identified by data gathering module 104 as under-utilized, then data gathering module 104 may notify component utilization controller module 106 that one or more heavily-utilized electronic mailbox stored in the first database 200A may be moved to the second database 200B.

Figure 4:
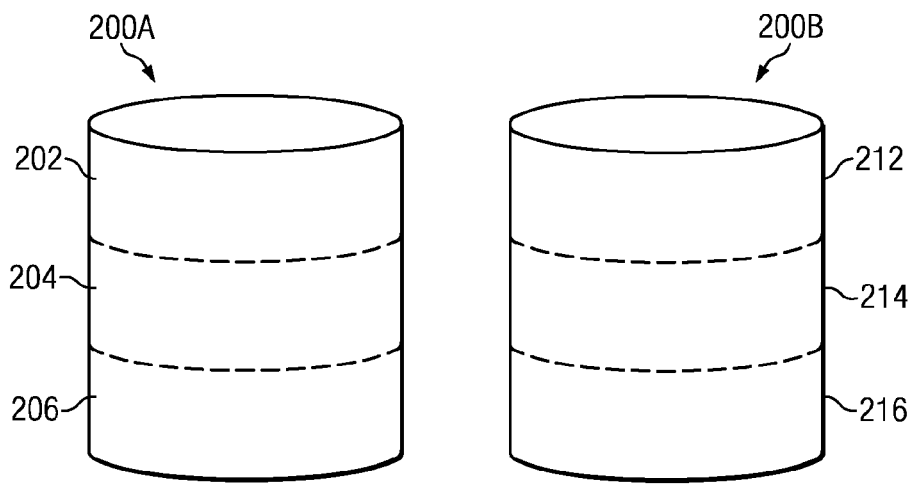
FIG. 4 illustrates a plurality of databases, wherein electronic mailboxes are distributed across the plurality databases in a balanced manner, in accordance with teachings of the present disclosure.

FIG. 4 illustrates a plurality of databases 200, wherein electronic mailboxes are distributed across the plurality of databases 200 in a balanced manner, in accordance with teachings of the present disclosure. As depicted in FIG. 4, the plurality of databases 200 may include a first database 200A and a second database 200B. Also, the first database 200A may comprise one or more electronic mailboxes that may be heavily-utilized electronic mailboxes 202, moderately-utilized electronic mailboxes 204, and/or lightly-utilized electronic mailboxes 206. Additionally, the second database 200B may comprise one or more electronic mailboxes that may be heavily-utilized electronic mailboxes 212, moderately-utilized electronic mailboxes 214, and/or lightly-utilized electronic mailboxes 216. The identification of heavily-utilized, moderately-utilized, and lightly-utilized electronic mailboxes was described in more detail with reference to FIG. 1. Electronic mailboxes were described in more detail with reference to FIG. 2.

As an illustrative example of the methods and systems described in more detail in FIGS. 1 and 5, the first database 200A and the second database 200B may have had electronic mailboxes moved among themselves or among themselves and other databases 200 belonging to the plurality of databases 200. This moving of electronic mailboxes may have occurred after data gathering module 104 may have notified component utilization controller module 106 that one or more heavily-utilized electronic mailboxes in an over-utilized database 200 could be moved to an under-utilized database 200. As an example, the first database 200A may have been identified as an over-utilized database 200 and the second database 200B may have been identified as an under-utilized database 200, wherein both identifications may have been made by data gathering module 104. Next, the first database 200A may have then had one or more heavily-utilized electronic mailboxes, identified by component utilization controller module 106, moved to the second database 200B. Additionally, component utilization controller 106 may have identified one or more lightly-utilized or moderately-utilized electronic mailboxes on the second database 200B and moved one or more of those electronic mailboxes to the first database 200A.

The distribution of electronic mailboxes in a "balanced manner" may, or may not, be similar to the initial distribution of electronic mailboxes in a balanced manner described in FIG. 1. In certain embodiments, the number of heavily-utilized, moderately-utilized, and lightly-utilized electronic mailboxes on database 200A and database 200B may be identical. In another embodiment, the number of heavily-utilized, moderately-utilized, and lightly-utilized electronic mailboxes on database 200A and database 200B may be substantially similar, but not identical.

FIG. 5 depicts a flow chart of an example method 500 for balancing a plurality of electronic mailboxes among a plurality of databases 200, in accordance with certain embodiments of the present disclosure. In certain embodiments, method 500 includes moving electronic mailboxes among databases 200 based at least on the utilization of databases 200 and/or on the utilization of electronic mailboxes stored on databases 200.

According to one embodiment, method 500 preferably begins at step 502. As noted above, teachings of the present disclosure may be implemented in a variety of configurations of system 100. As such, the preferred initialization point for method 500 and the order of the steps 502-520 comprising method 500 may depend on the implementation chosen.

At step 502, a plurality of electronic mailboxes located on databases 200 may be initially distributed in a balanced manner by electronic mailbox controller 114 and/or through some other balancing mechanism. After step 502 is completed, method 500 may move proceed to step 504.

At step 504, data gathering module 104 may identify the upper threshold utilization value and lower threshold utilization value for databases 200 as described in more detail above with respect to FIG. 1. After step 504 is completed, method 500 may move proceed to step 506.

At step 506, data gathering module 104 may receive actual utilization values for databases 200. After step 506 is completed, method 500 may move proceed to step 508.

At step 508, a determination may be made by data gathering module 104 as to whether there exist any over-utilized databases 200 located on database server 110. If there are not any over-utilized databases 200, method 500 may return to step 506 where data gathering module 104 may receive actual utilization values for databases 200.

At step 508, if there are any over-utilized databases 200, method 500 may proceed to step 510. At step 510, a determination may be made by data gathering module 104 as to whether there exist any under-utilized databases 200 located on database server 110. If no under-utilized databases 200 exist, a notification may be created by data gathering module 104. In certain embodiments, the notification may be sent to an administrator. After the notification is created, method 500 may then proceed to step 520 where method 500 may end.

At step 510, if an under-utilized database 200 is identified, data gathering module 104 may notify component utilization controller module 106 that there may be an over-utilized database 200 that may have one or more heavily-utilized electronic mailboxes that may be moved to an under-utilized database 200. After component utilization controller module has been notified, method 500 may proceed to step 514.

At step 514, after being notified by data gathering module 104 that there may be an over-utilized database 200 that may have one or more heavily-utilized electronic mailboxes that may be moved to an under-utilized database 200, component utilization controller module 106 may identify any heavily-utilized electronic mailboxes located on the over-utilized database 200. After step 514 is completed, method 500 may move proceed to step 516.

At step 516, component utilization controller module 106 may identify any lightly-utilized or moderately-utilized electronic mailboxes located on the under-utilized database 200. After step 516 is completed, method 500 may move proceed to step 518.

At step 518, component utilization controller module 106 may move one or more heavily-utilized electronic mailboxes from the over-utilized database 200 to the under-utilized database 200. Further, component utilization controller module 106 may move one or more lightly-utilized or moderately-utilized electronic mailboxes from the under-utilized database 200 to the over-utilized database 200. In certain embodiments, this exchange of heavily-utilized electronic mailboxes for lightly-utilized or moderately-utilized electronic mailboxes may be done on a one-to-one basis.

After completion of step 518, method 500 may proceed again to step 506, where data gathering module 104 may receive actual utilization values for databases 200.

Although FIG. 5 discloses a certain order of steps to be taken with respect to method 500, the steps comprising method 500 may be completed in any suitable order. For example, the identification of lightly-utilized or moderately-utilized electronic mailboxes done at step 516 may be performed before the identification of heavily-utilized electronic mailboxes done at step 514. As an additional example, after creating a notification at step 512, method 500 may return to step 506 to continue to receive actual utilization values rather than proceeding to step 520 to end.

Using the methods and systems disclosed herein, certain problems associated with the storage of electronic mailboxes on databases may be improved, reduced, or eliminated altogether. For example, the methods and systems disclosed herein provide a way to balance the load of electronic mailboxes while taking into account the dynamic nature of electronic mailbox usage.

Although the present disclosure has been described in detail, it should be understood that various changes, substitutions, and alterations can be made hereto without departing from the spirit and the scope of the disclosure.

What is claimed is:

1. A method for balancing a plurality of electronic mailboxes among a plurality of databases, comprising:
    comparing an actual utilization value for a first database to an upper threshold utilization value for the first database and, if the actual utilization value of the first database is greater than the upper threshold utilization value of the first database, identifying the first database as over-utilized, wherein the first database is one of the plurality of databases;
    comparing an actual utilization value for a second database to a lower threshold utilization value for the second database and, if the actual utilization value of the second database is less than the lower threshold utilization value of the second database, identifying the second database as under-utilized, wherein the second database is one of the plurality of databases;

comparing an actual usage value of a first electronic mailbox, the first electronic mailbox being one of a plurality of electronic mailboxes stored in the first database, to an upper threshold usage value for the first electronic mailbox and, if the actual usage value of the first electronic mailbox is greater than the upper threshold usage value of the first electronic mailbox, identifying the first electronic mailbox as a heavily-utilized first electronic mailbox;

identifying a lightly-utilized second electronic mailbox or a moderately-utilized third mailbox in the second database;

moving the heavily-utilized first electronic mailbox to the second database; and moving one of the lightly-utilized second electronic mailbox or the moderately-utilized third mailbox to the first database, wherein electronic mailboxes are moved between the first database and the second database on a one-to-one basis.

2. The method of claim 1, further comprising:

comparing an actual usage value of a second electronic mailbox, the second electronic mailbox being one of the plurality of electronic mailboxes stored in the second database, to a lower threshold usage value for the second electronic mailbox and, if the actual usage value of the second electronic mailbox is less than the lower threshold usage value of the second electronic mailbox, identifying the second electronic mailbox as a lightly-utilized second electronic mailbox; and comparing an actual usage value of a third electronic mailbox, the third electronic mailbox being one of a plurality of electronic mailboxes stored in the second database, to a lower threshold usage value for the third electronic mailbox and an upper threshold usage value for the third electronic mailbox and, if the actual usage value of the third electronic mailbox is greater than the lower threshold usage value of the third electronic mailbox and less than the upper threshold usage value of the third electronic mailbox, identifying the third electronic mailbox as a moderately-utilized third electronic mailbox.

3. The method of claim 1, wherein a notification is created if the first database is identified as over-utilized and no second database is identified as under-utilized.

4. The method of claim 1, wherein the upper threshold utilization value for the first database comprises one of manufacturer specification data for the first database and industry standard specification data for the first database.

5. The method of claim 1, wherein the lower threshold utilization value for the second database comprises one of manufacturer specification data for the second database and industry standard specification data for the second database.

6. The method of claim 1, wherein the actual usage value of the first electronic mailbox comprises a measure of the number of requests to a mail server over a period of time.

7. The method of claim 1, wherein moving the heavily-utilized first electronic mailbox to the second database comprises considering the performance characteristics of the second database.

8. An information handling system for balancing a plurality of electronic mailboxes among a plurality of databases, the information handling system comprising:

a processor;

a non-transitory computer readable medium communicatively coupled to the processor; and computer-executable instructions encoded in the computer readable medium, the instructions, when executed by the processor, operable to perform operations comprising:

comparing an actual utilization value of a first database to an upper threshold utilization value for the first database and, if the actual utilization value of the first database is greater than the upper threshold utilization value of the first database, identify the first database as over-utilized, wherein the first database is one of the plurality of databases;

comparing an actual utilization value of a second database, the second database being one of the plurality of databases, to a lower threshold utilization value of the second database and, if the actual utilization value of the second database is less than the lower threshold utilization value of the second database, identify the second database as under-utilized, wherein the second database is one of the plurality of databases;

notifying a component utilization controller module to move a heavily-utilized first electronic mailbox in the first database to the second database, wherein the heavily-utilized first electronic mailbox is identified based at least on comparing an actual usage value of the first electronic mailbox to an upper threshold usage value for the first electronic mailbox; and notifying the component utilization controller module to move one of a lightly-utilized second electronic mailbox or a moderately-utilized third mailbox in the second database to the first database;

wherein electronic mailboxes are moved between the first database and the second database on a one-to-one basis.

9. The information handling system of claim 8, wherein the upper threshold utilization value for the first database comprises one of manufacturer specification data for the first database and industry standard specification data for the first database.

10. The information handling system of claim 8, wherein the lower threshold utilization value for the second database comprises one of manufacturer specification data for the second database and industry standard specification data for the second database.

11. The information handling system of claim 8, wherein a notification is created if the first database is identified as over-utilized and no second database is identified as under-utilized.

12. An information handling system for balancing a plurality of electronic mailboxes among a plurality of databases, the information handling system comprising:

a processor;

a non-transitory computer readable medium communicatively coupled to the processor; and computer-executable instructions encoded in the computer readable medium, the instructions, when executed by the processor, operable to perform operations comprising:

receiving a notification from a data gathering module to move a heavily-utilized first electronic mailbox in an over-utilized database to an under-utilized database;

comparing an actual usage value of a first electronic mailbox to an upper threshold usage value for the first electronic mailbox and, if the actual usage value of the first electronic mailbox is greater than the upper threshold usage value of the first electronic mailbox, identify the first electronic mailbox as a heavily-utilized first electronic mailbox, wherein the first electronic mailbox is one of the plurality of electronic mailboxes stored in the over-utilized database;

identifying a lightly-utilized second electronic mailbox or a moderately-utilized third mailbox in the second database;

moving the heavily-utilized first electronic mailbox in the over-utilized database to the under-utilized database; and moving one of the lightly-utilized second electronic mailbox or the moderately-utilized third electronic mailbox to the first database, wherein electronic mailboxes are moved between the first database and the second database on a one-to-one basis.

13. The information handling system of claim 12, wherein the computer-executable instructions, when executed by the processor, are further operable to perform operations comprising:

comparing an actual usage value of a second electronic mailbox, the second electronic mailbox being one of the plurality of electronic mailboxes stored in the under-utilized database, to a lower threshold usage value for the second electronic mailbox and, if the actual usage value of the second electronic mailbox is less than the lower threshold usage value of the second electronic mailbox, identify the second electronic mailbox as a lightly-utilized second electronic mailbox; and comparing an actual usage value of a third electronic mailbox, the third electronic mailbox being one of a plurality of electronic mailboxes stored in the second database, to a lower threshold usage value for the third electronic mailbox and an upper threshold usage value for the third electronic mailbox and, if the actual usage value of the third electronic mailbox is greater than the lower threshold usage value of the third electronic mailbox and less than the upper threshold usage value of the third electronic mailbox, identifying the third electronic mailbox as a moderately-utilized third electronic mailbox.

14. The information handling system of claim 12, wherein the computer-executable instructions, when executed by the processor, are further operable to perform operations comprising moving the lightly-utilized second electronic mailbox to the over-utilized database.

15. The method of claim 1, wherein:
the actual utilization value for the first database comprises a number of input-output operations over a period of time for an information handling system component on which the first database is located; and
the actual utilization value for the second database comprises a number of input-output operations over a period of time for an information handling system component on which the second database is located.

16. The information handling system of claim 8, wherein:
the actual utilization value for the first database comprises a number of input-output operations over a period of time for an information handling system component on which the first database is located; and
the actual utilization value for the second database comprises a number of input-output operations over a period of time for an information handling system component on which the second database is located.

17. The information handling system of claim 12, wherein:
the actual utilization value for the first database comprises a number of input-output operations over a period of time for an information handling system component on which the first database is located; and
the actual utilization value for the second database comprises a number of input-output operations over a period of time for an information handling system component on which the second database is located.

18. The information handling system of claim 8, wherein:
identifying the lightly-utilized second electronic mailbox comprises comparing an actual usage value of a second electronic mailbox to a lower threshold usage value for the second electronic mailbox and, if the actual usage value of the second electronic mailbox is less than the lower threshold usage value of the second electronic mailbox, identifying the second electronic mailbox as a lightly-utilized second electronic mailbox; and
identifying the moderately-utilized third electronic mailbox comprises comparing an actual usage value of a third electronic mailbox to a lower threshold usage value for the third electronic mailbox and an upper threshold usage value for the third electronic mailbox and, if the actual usage value of the third electronic mailbox is greater than the lower threshold usage value of the third electronic mailbox and less than the upper threshold usage value of the third electronic mailbox, identifying the third electronic mailbox as a moderately-utilized third electronic mailbox.

\* \* \* \* \*